United States Patent [19]

Houki et al.

[11] Patent Number: 4,718,768

[45] Date of Patent: Jan. 12, 1988

[54] IMAGE DATA CORRECTION

[75] Inventors: Tetsuo Houki, Kyoto; Ikuo Mitsuka; Akira Kuwabara, both of Shiga; Hitoshi Haibara; Takashi Sakamoto, both of Kyoto, all of Japan

[73] Assignee: Dainippon Screen Mfg. Co., Ltd., Kyoto, Japan

[21] Appl. No.: 731,142

[22] Filed: May 6, 1985

[30] Foreign Application Priority Data

May 10, 1984 [JP] Japan ................................. 59-94047
May 10, 1984 [JP] Japan ................................. 59-94048

[51] Int. Cl.$^4$ ........................... G01J 3/50; H04N 1/46
[52] U.S. Cl. ..................................... 356/402; 250/205; 358/75
[58] Field of Search ............... 356/402, 420, 317, 318; 250/205; 358/75

[56] References Cited

U.S. PATENT DOCUMENTS

| | | | |
|---|---|---|---|
| 4,055,768 | 10/1977 | Bromberg | 356/317 X |
| 4,250,488 | 2/1981 | Haupt | 250/205 |
| 4,320,970 | 3/1982 | Dowben et al. | 356/317 |
| 4,489,350 | 12/1984 | Kimura | 358/213 |
| 4,566,797 | 1/1986 | Kaffka et al. | 356/420 X |

FOREIGN PATENT DOCUMENTS

| | | |
|---|---|---|
| 2816325 | 10/1979 | Fed. Rep. of Germany . |
| 3226680 | 2/1983 | Fed. Rep. of Germany . |
| 55-14729 | 2/1980 | Japan . |
| 58-171175 | 10/1983 | Japan . |
| 59-8478 | 1/1984 | Japan . |

Primary Examiner—Vincent P. McGraw
Attorney, Agent, or Firm—Lowe, Price, LeBlanc, Becker & Shur

[57] ABSTRACT

In image scanning in which three lamps provided for Red, Green and Blue color components are switched successively and light transmitted through or reflected at an original is received by a CCD line photosensor, variation in lamp output light quantity with time and relative variations in output light intensity among the three lamps are corrected. In one embodiment, each lamp is turned off or operation of the CCD is terminated when the light quantity emitted from the lamp reaches a setup quantity. In a second embodiment, a voltage corresponding to the color component data obtained by the CCD is divided by a voltage corresponding to the effective light quantity emitted from each lamp.

12 Claims, 10 Drawing Figures

IMAGE DATA CORRECTION

FIELD OF THE INVENTION

The present invention relates generally to image reproduction, and more particularly, to a method of and system for correcting image data obtained by a line photosensor.

BACKGROUND OF THE INVENTION

Recently, with use of a small line photosensor (for example a CCD photosensor), highly condensed, two-dimensional data have become obtainable. Image data of an original are scanned by conducting light transmitted through or reflected at an original image to a line photosensor and varying the mutual positions of the original and the line photosensor in the subscanning direction (perpendicular to the lengthwise, or main scanning, direction of the line photosensor). Furthermore to record a color reproduction image, the three necessary data components, R (Red), G (Green) and B (Blue), have been conventionally obtained by either one of the following methods.

Japanese Patent Laid Open No. 56-58370, discloses a method by which original image three color component data are obtained by positioning successively three filters for R, G and B color components in front of a line photosensor when white light carrying the image data of the original is received by the line photosensor. The photosensor analyzes each scanning line three times for each color component as the original advances intermittently in the sub-scanning direction.

Japanese Patent Laid Open No. 56-16942 or 58-212255 discloses a method by which original image three color component data are obtained by time-sharing the switching of three lamps for R, G and B color components when light emitted from each lamp and carrying corresponding color component data of the original is received by a line photosensor. The photosensor also analyzes each scanning line three times for each color component as the original advances intermittently in the sub-scanning direction.

These methods have drawbacks in that the light quantity of each lamp is affected by voltage drift and by other factors over time, and further, that the effective light quantities for analyzing the color component data of R, G and B do not always agree with each other whether they are obtained by color component filters or by the individual lamps. Furthermore in the latter method, since the light intensities of the three lamps tend to vary individually owing to external or internal instabilities, total light quantities of the lamps within a given period are generally unequal.

SUMMARY OF THE INVENTION

Accordingly, it is an object of the present invention to provide a method of and apparatus for correcting color component data obtained by means of light emitted from three individual lamps that are time shared.

Another object of the present invention is to provide such a method and apparatus capable of compensating for the difference between the effective light quantities emitted from a plurality of lamps as well as for the variation of light quantity emitted from each lamp over time.

To satisfy the above objects, according to the technique of the present invention, a control photosensor which directly receives the light of a plurality of lamps determines the cutoff time of the lamps or disables a photosensor used for input scanning by detecting a predetermined light quantity.

In practice, in the present invention, the light quantity received by a control photosensor is measured by a light quantity monitor, which supplies to a timing controller a signal in response to a predetermined light quantity received by the control photosensor. In response to that information, the timing controller controls a lamp controller to cutoff the lamp. It is noteworthy that when a CCD sensor array is used as the line photosensor, the operating time of the CCD is limited by its light integration time.

Realization of the above method can bring about an effect of rendering the effective light quantity from the lamps constant while the line photosensor is operative, and this leads to constant image reproduction free of possible variation of the quantity of light generated by the lamps.

In another embodiment of the invention, the light quantity received by a control photosensor during operation of a line photosensor, is applied as a divisor to adjust the output of the line photosensor. In this case, the light quantity received by the control photosensor is measured by a light quantity monitor, the output of which is used as a divisor for the image data from the line photosensor.

It must be noted incidentally that the sensitivity of the control photosensor in each of the abovementioned two embodiments is preferably as close as possible to that of the line photosensor.

Consequently it is found that in the method and apparatus of the present invention, adjustment of image data obtained by a line photosensor using the effective light quantity from a lamp during emission is capable of reproducing images free of any variation in the quantity of light generated by the lamp. When lamps provided for the three color components, R, G, and B, are time shared to obtain corresponding R, G and B color component data, any variation in the light intensity of each lamp during emission can be corrected.

The above and other objects and features of the present invention can be appreciated more fully from the following detailed description when read with reference to the accompanying drawings.

BRIEF DESCRIPTION OF THE DRAWINGS

FIGS. 2(a) and (b) are lamp switching timing charts in accordance with the embodiment of FIG. 1.

FIGS. 3(a) and (b) are timing charts for switching other lamps in accordance with the embodiment of FIG. 1.

DETAILED DESCRIPTION OF A PREFERRED EMBODIMENT

Figure 1:
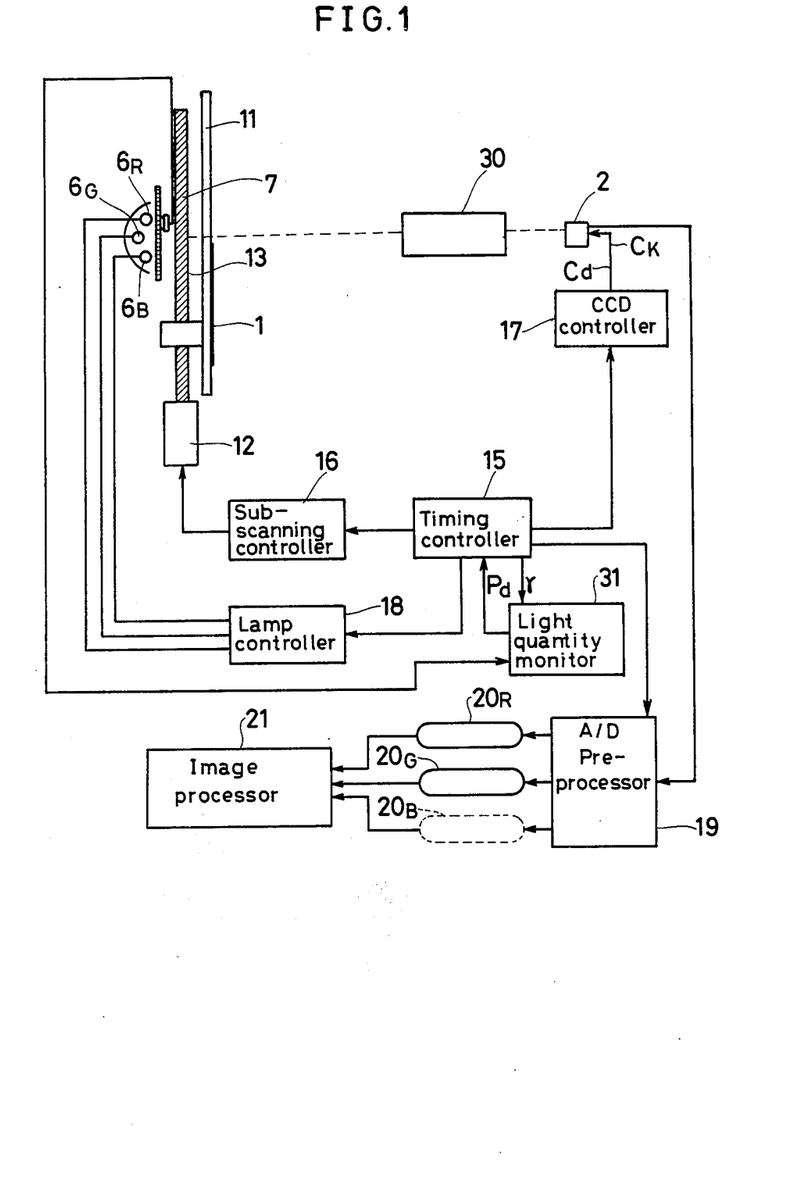
FIG. 1 is a block diagram of an embodiment of the present invention.

In FIG. 1, an original table 11 is moved in the sub-scanning direction (perpendicular to the lengthwise direction of a CCD line photosensor 2) by a feed screw 13 driven by a sub-scanning motor 12, in turn controlled by a sub-scanning controller 16. Behind the original table 11 are provided three light source lamps $6_R$, $6_G$ and $6_B$, respectively, for emitting light of three color components, R, G, and B. The light emitted from the lamps $6_R$, $6_G$ and $6_B$ are conducted through an original 1 and an optical device 30, such as a lens, to the sensitive surface of the CCD line photosensor 2. The lamps $6_R$, $6_G$ and $6_B$ are controlled by a lamp controller 18 so as to be periodically switched on and off in turn, for example, in the order of $6_R$—$6_G$—$6_B$.

Consequently, light emitted from the lamps $6_R$, $6_G$ and $6_B$ and carrying the corresponding image data of the original 1 are collected by the CCD line photosensor 2 as electronic charges and successively transferred to a pre-processor 19 for A/D conversion under the control of a CCD controller 17.

It should be noted that the sub-scanning controller 16, the CCD controller 17 and the lamp controller 18 receive necessary timing pulses generated by a timing controller 15.

In front of the lamps $6_R$, $6_G$ and $6_B$ are provided a control photosensor 7 for directly receiving light therefrom, and the output of the control photosensor 7 is input to a light quantity monitor 31. The light quantity monitor 31 is exposed to light quantity accumulated as an electronic charge in the control photosensor 7. The light quantity measured by monitor 31 is supplied to timing controller 15. The controller 15 in response controls the lamps to maintain the measured light quantity below a predetermined value.

Color component data associated with each lamp 6 are obtained in the following manner. As the original table 11 in the sub-scanning direction stops, at first the lamp $6_R$ emits light to obtain R color component data. The R color component data collected by the CCD line photosensor 2 are transferred to the pre-processor 19 to undergo an A/D conversion and then are stored into a delay buffer memory $20_R$. In the same manner, G color component data are collected by the CCD line photosensor when the lamp $6_G$ emits light and stored into a delay buffer memory $20_G$. Subsequently when the lamp $6_B$ emits light B color component data are collected by the CCD line photosensor 2 and stored into a delay buffer memory $20_B$. When all the R, G and B color component data of an identical scanning line are read out from the CCD line photosensor 2, the original table 11 is advanced by one scanning line in the subscanning direction, and the above-mentioned process (operating cycle of the apparatus of FIG. 1) is repeated for each of the subsequent scanning lines. The R, G and B color component data stored in the delay buffer memory $20_R$, $20_G$ and $20_B$ are now synchronously output to an image processor 21.

Figure 2:
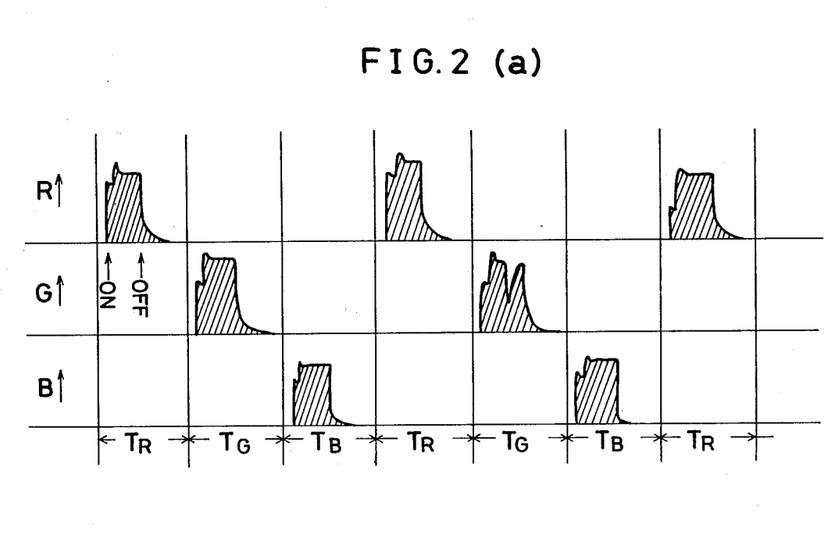
Figure 2B:
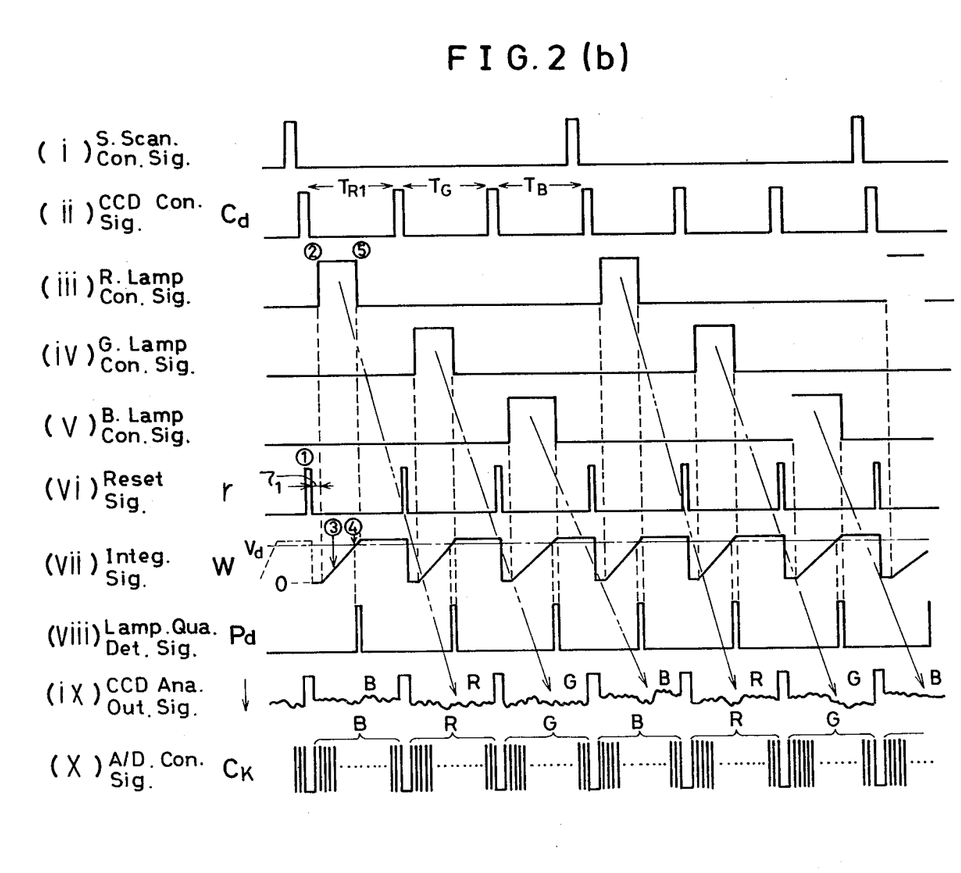
Figure 4:
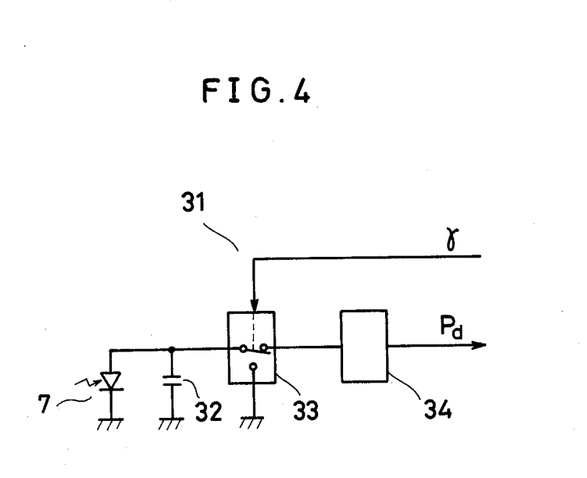
FIG. 4 is an embodiment of a light quantity monitor used in the invention.

FIG. 2(a) shows a timing chart of the switching of lamps $6_R$, $6_G$ and $6_B$ in accordance with the embodiment of FIG. 1. The lamps $6_R$, $6_G$ and $6_B$ are successively turned on within corresponding integration periods of the CCD line photosensor 2. When the effective light quantity emitted from each of the lamps, i.e., the effective light quantity received by the control photosensor 7 (indicated as hatched areas in FIG. 2(a)), reaches a certain amount (detection level) established for each of the R, G and B components in each of integration periods $T_R$, $T_G$ and $T_B$, the corresponding lamp is turned off. More specifically, with reference to FIG. 2(b), note that a CCD analog output signal (ix) shown in FIG. 2(b) is a series of three color component signals. A CCD control signal $C_D$ of a period V (V is one integration period of the CCD line photosensor) is input from the CCD controller 17 to the CCD line photosensor 2, while a reset signal r is input from the timing controller 15 to the light quantity monitor 31 synchronized with the CCD control signal $C_D$. When the reset signal r becomes high at (1), a movable contact of an analog switch 33 (FIG. 4) of the light quantity monitor 31 is grounded to discharge capacitor 32. An integration signal W output from the control photosensor 7 thus is at zero. When the reset signal r becomes low, the movable contact of the analog switch 33 is applied to the input of a voltage level detector 34 to render the capacitor 32 ready for charging by the output current of the control photosensor 7. Then, lamp $6_R$ is turned on at a time $T_1$ after a risetime (or a falltime) of the reset signal r at (2). In response to turning on of the lamp $6_R$, the light quantity received by the control photosensor 7, namely the voltage level of the integration signal W, is increased gradually. When the signal W reaches the setup voltage level $V_D$ at (4), voltage level detector 34 generates a detection signal $P_d$ and turns the lamp $6_R$ off at (5).

Thereafter, the same operation is carried out for the lamps $6_G$ and $6_B$ successively.

In the meantime, the R, G and B color component data serially obtained as an analog signal by the CCD line photosensor (the signal (ix) in FIG. 2(b)) are successively read out to be converted into a corresponding digital signal under the control of an A/D control signal (the signal (x) in FIG. 2(b)) and then stored in the buffer memory $20_R$, $20_G$ and $20_B$, respectively.

Figure 3:
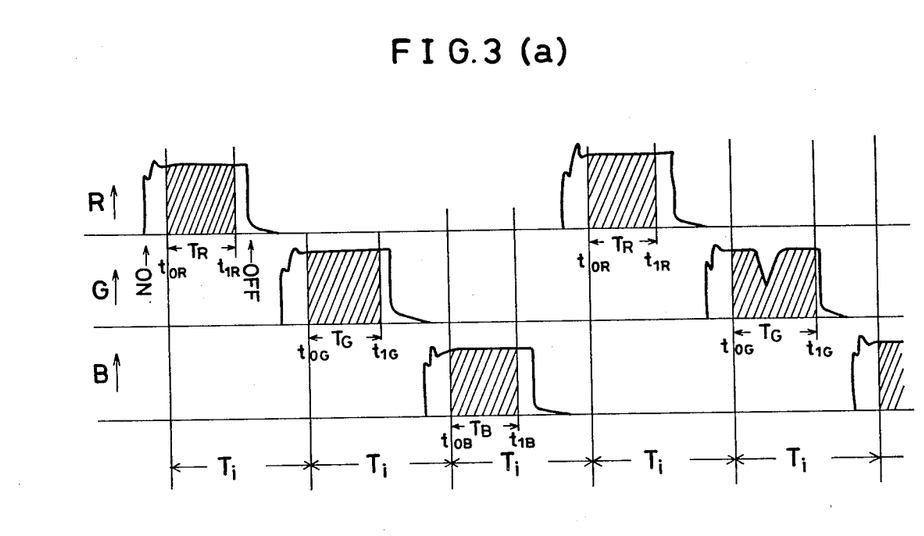
Figure 3B:
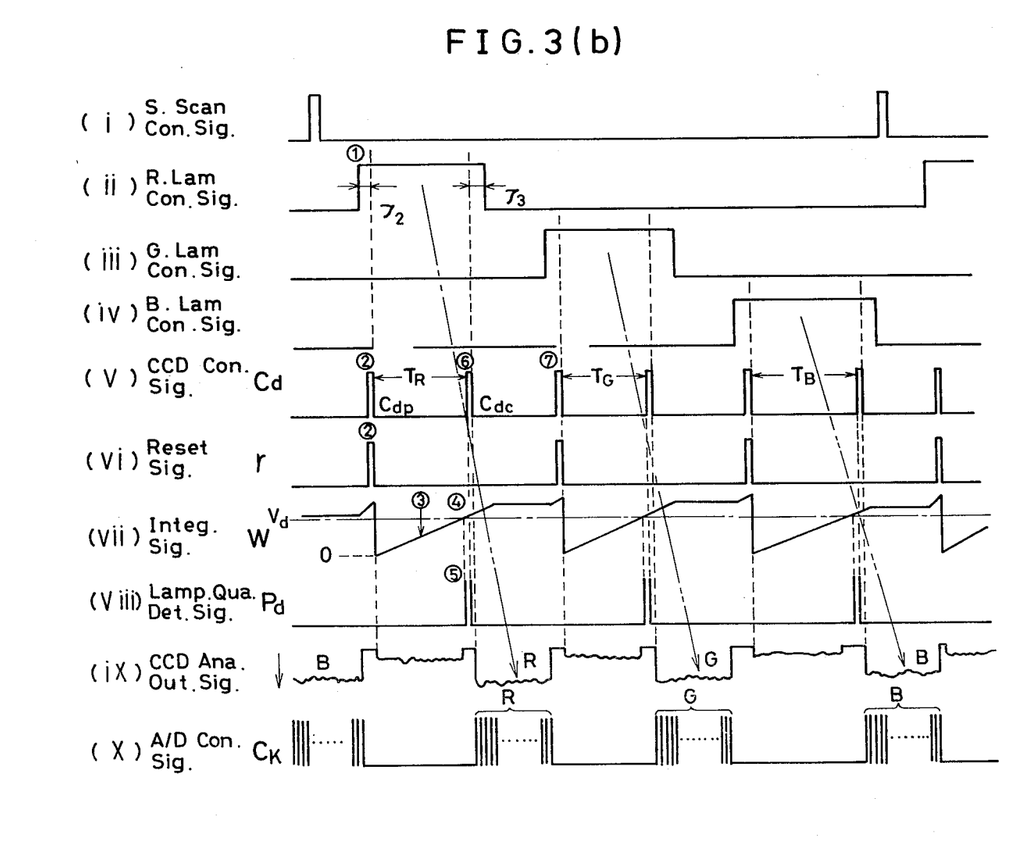

FIG. 3(a) shows a timing chart of another mode of switching the lamps $6_R$, $6_G$ and $6_B$, in which the integration period of the CCD line photosensor 2 is controlled so that the effective light quantity received by the control photosensor 7 (indicated as hatched areas in FIG. 3(a)) during the light emission period of each of the lamps $6^R$, $6^G$ $6^B$ agree with a predetermined light quantity set up for each of the R, G and B color components. It is noteworthy at this juncture that the light emission of each lamp precedes the light reception by the control photosensor 7. It is preferable in this case that the interval $T_i$ between each starting time of the integration period of the control photosensor 7 be kept constant while the integration termination times $t_{1R}$, $t_{1G}$ and $t_{1B}$ are varied. The intervals respectively between the integration starting times $t_{1R}$, $T_{1G}$, $t_{1B}$ and the integration terminating times $t_{0R}$, $t_{0G}$, $t_{0B}$ are not utilized.

The CCD controller 17 generates periodic control pulses $C_{dp}$ and a reference control pulse $C_{dc}$ approximately in the middle of the interval of the periodic control pulses $C_{dp}$. In the meantime, reset signals r synchronized with the periodic control pulse $C_{dp}$ are applied by the timing controller 15 to the light quantity monitor 31. The lamp $6_r$ is turned on at a time $T_2$ before a risetime (or a falltime) of the reset signal r at (1). The capacitor 32 is discharged by the reset signal r to cause the voltage level of the integration signal W to be zero. When the reset signal r becomes low, the capacitor 32 begins to be charged in response to the output current of the control photosensor 7 toward a corresponding integration signal W. When the voltage level of the integration signal W is increased to a setup voltage level $V_d$ at (4), the voltage level detector 34 generates a detection signal $P_d$ at (5), the reference control pulse $C_{dc}$ is generated at (6), and then the next integration cycle is carried out. At time $T_3$ after the risetime (or a falltime) of the reference control pulse $C_{dc}$, the lamp $6_R$ is turned off. Then the same operation as above is carried out for the lamps $6_G$ and $6_B$, respectively.

The light emitted from each of the lamps $6_R$, $6_G$ and $6_B$ is successively collected by the CCD line photosensor 2 and then output therefrom in an analog form in corresponding subsequent intervals between the reference control pulses $C_{dc}$ and the periodic control pulses $C_{dp}$. The analog signal (ix) from the CCD line photosensor 2 is now input synchronously with an A/D control signal $C_K$ to the pre-processor 19, which converts it to a corresponding digital signal for storage in corresponding buffer memories $20_R$, $20_G$ and $20_B$.

It must be noted in the embodiment of FIG. 3(a) that the color component data obtained in each interval between the reference control pulses $C_{dc}$ and the periodic control pulses $C_{dp}$ (for example, the interval between pulses (6) and (7)) are not utilized, and therefore no corresponding A/D control pulses are generated.

The timing controller 15 of course takes the characteristic of the control photosensor 7 into consideration in controlling the lamps $6_R$, $6_G$ and $6_B$ in order to achieve the correct white balance between the color components of R, G and B.

These two embodiments pertaining to the apparatus of FIG. 1 are applicable to a method in which color component filters provided in front of a line photosensor are time-shared to filter the light emitted from a white lamp, as well as to a method in which three color component data are separately scanned and stored in memories.

Figure 5:
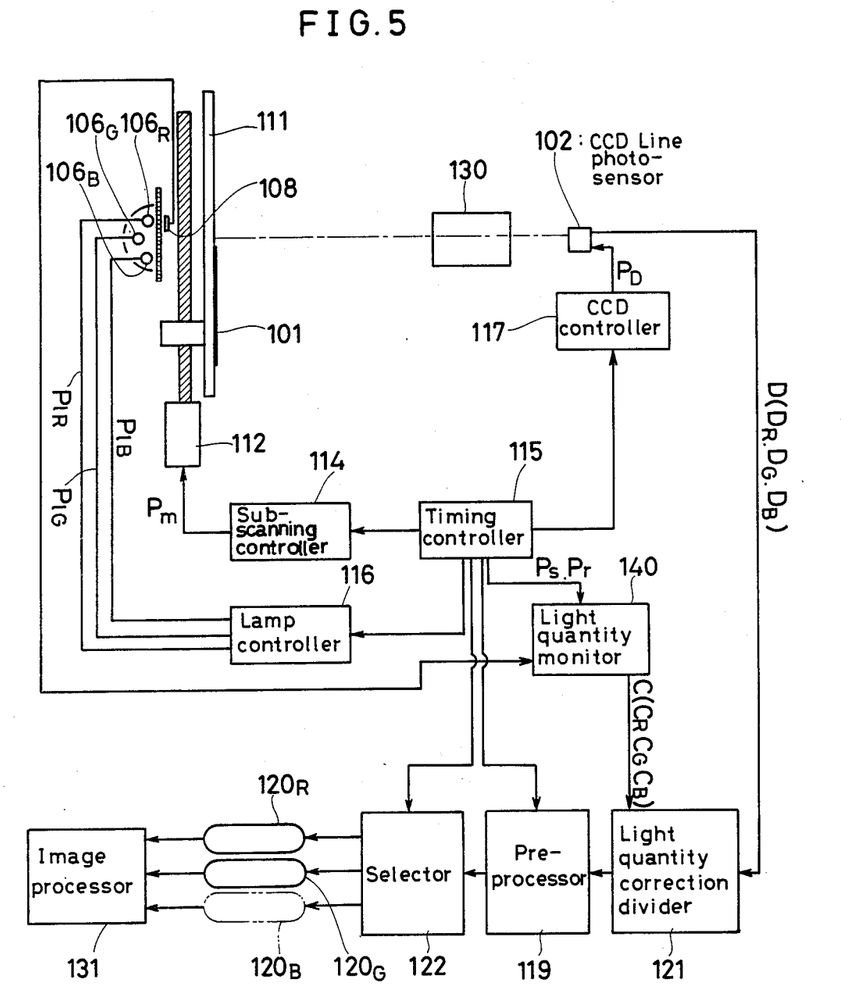
FIG. 5 is a block diagram of another embodiment of the present invention.
Figure 6:
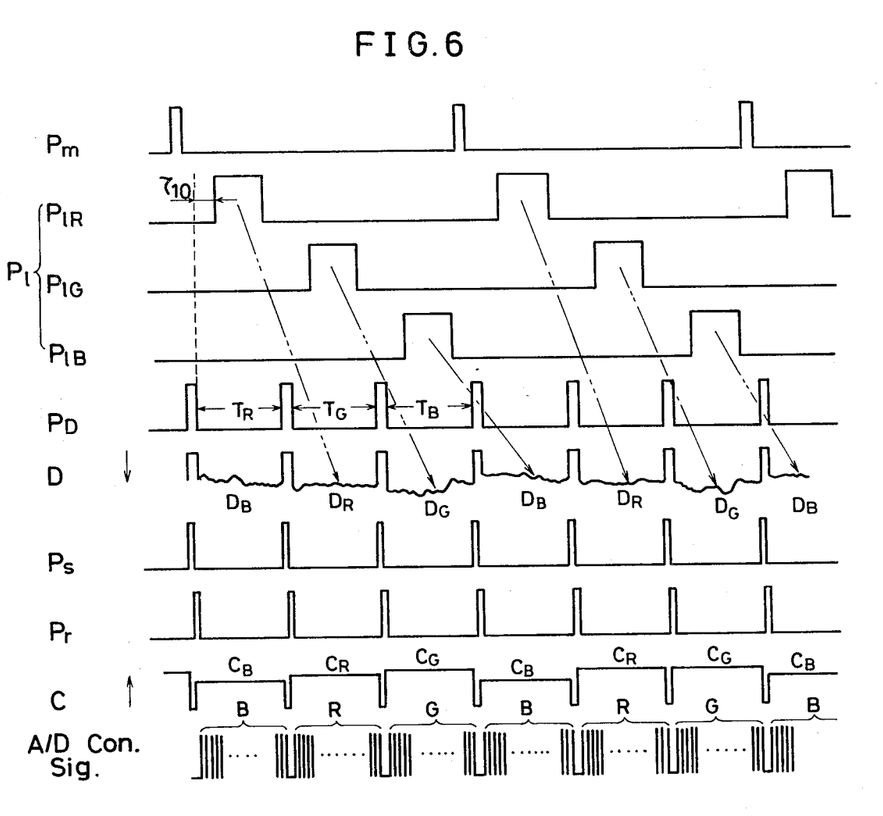
FIG. 6 is a lamp switching timing chart in accordance with the embodiment of FIG. 5 pertaining to the lamps of FIG. 2(a).
Figure 7:
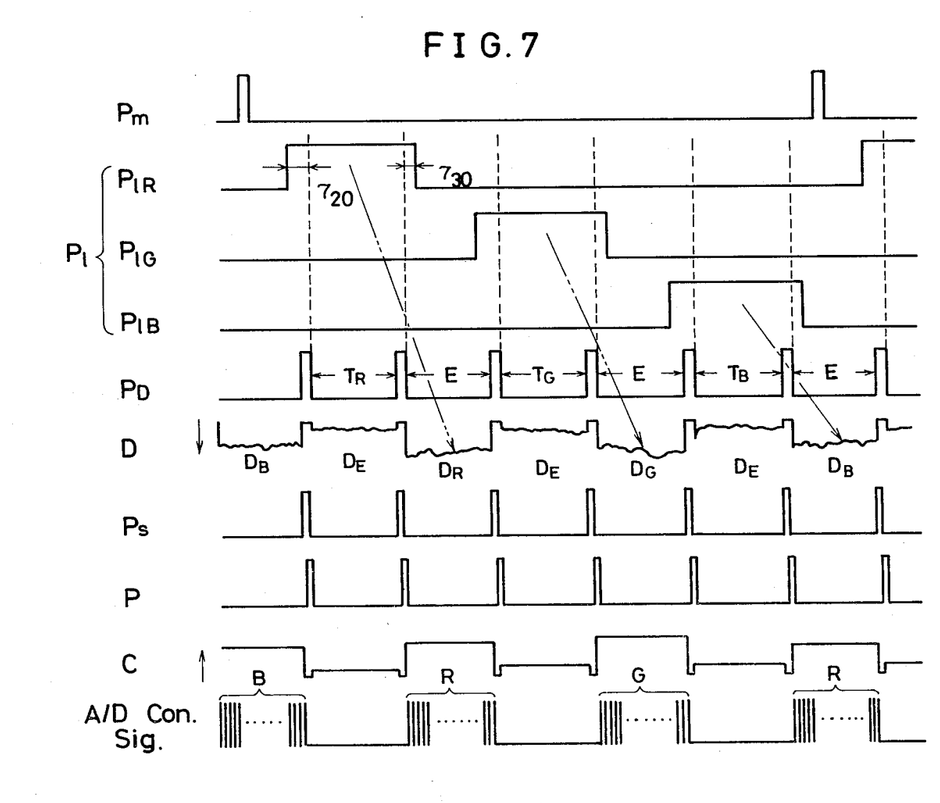
FIG. 7 is a timing chart in accordance with the embodiment of FIG. 5 pertaining to the lamps of FIG. 3(a).

FIG. 5 shows a block diagram of another embodiment of the present invention, while FIG. 6 corresponds to the switching of FIG. 2(a), and FIG. 7 corresponds to that of FIG. 3(a).

The embodiment of FIG. 5 operates in accordance with the flow chart of FIG. 6 in the following manner. An original table 111 is moved intermittently in the sub-scanning direction by a sub-scanning motor 112 synchronized to a sub-scanning control signal $P_m$ generated by a sub-scanning controller 114. Behind the original table 111 are provided three lamps $106_R$, $106_G$ and $106_B$ for color components R, G and B. Lamps $106_R$, $106_G$ and $106_B$ are successively turned on and off according to respective lamp control signals $P_{1R}$, $P_{1G}$ and $P_{1B}$ generated by a lamp controller 116 synchronized with a CCD control signal $P_d$ during stopping of the original table 111 in the sub-scanning direction.

It should be noted that each of the lamps $106_R$, $106_G$ and $106_B$ is turned on at a time $T_{10}$ after a risetime (or a falltime) of a CCD control pulse and turned off before the risetime (or a falltime) of the next CCD control pulse. This is to prevent the light of adjoining lamps from being corrected by the CCD line photosensor 102 simultaneously. When the lamp $106_B$ is turned off, the original table 111 is advanced by one scanning line in the sub-scanning direction by the motor 112 in response to the sub-scanning control signal $P_m$. Then the above operation is repeated with the emission of lamp $106_R$. In the meantime, light emitted from the lamps $106_R$, $106_G$ and $106_B$ passes through an original 101 and an optical device 130, such as a lens, to the sensitive surface o a CCD line photosensor 102. The CCD line photosensor 102 is controlled by a periodic CCD control signal $P_D$ generated by a CCD controller 117 such that color component data $D_R$, $D_G$ and $D_B$ obtained respectively during periods $T_R$, $T_G$ and $T_B$ are generated in the corresponding succeeding periods as shown in FIG. 6. The thereby obtained color component data $D_R$, $D_G$ and $D_B$ are successively applied to a light quantity correction divider 121, described hereinafter.

There is also provided a control photosensor 108 in front of the lamps $106_R$, $106_G$ and $106_B$. The output signal of photosensor 108 is applied to a light quantity monitor 140 to measure the effective light quantity emitted from the lamps. It is noteworthy that the sensitivity characteristic of the control photosensor is preferably as close as possible to that of the CCD line photosensor 102.

Figure 8:
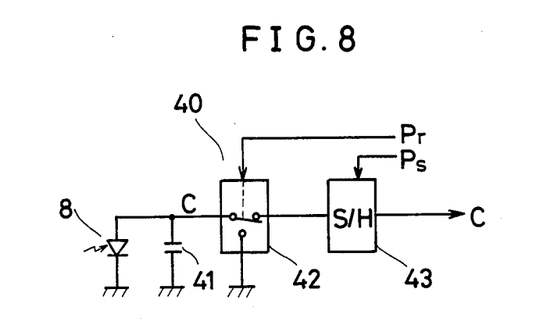
FIG. 8 is another embodiment of a light quantity monitor.

The light quantity monitor 140 is constructed as shown in FIG. 8, in which a current output from the control photo-sensor 8 charges capacitor 41 and then is input via an analog switch 42 to a sample and hold circuit 43 in accordance with a sampling pulse P received from a timing controller 115. The sample and hold circuit 43 holds the signal from the capacitor 41 until the input of the next sampling pulse $p_s$ thereto. Circuit 43 then outputs a correction signal C ($C_R$, $C_G$, $C_B$) to light quantity correction divider 121 in synchronization with the input of the color component data D ($D_R$, $D_G$, $D_B$). A movable contact of analog switch 42 normally is in contact with the capacitor 41 and the sample and hold 43. Meanwhile the switch 42 is grounded in response to a reset signal $P_r$ received from a timing controller 115 to discharge the capacitor 41. The light quantity correction divider 121 divides the color component data D ($D_R$, $D_G$, $D_B$) respectively by the corresponding one of the correction signals C ($C_R$, $C_G$, $C_B$) to supply corrected R, G and B color component data to a pre-processor 119.

Pre-processor 119 comprises an A/D converter to convert the form of the corrected R, G and B color component data from analog to digital and performs other necessary functions for carrying out color correction, gradation correction and so forth, on the color component data. The processed R, G and B color component data are first stored in buffer memories ($120_R$, $120_G$, $120_B$) respectively via selector 122 and then output to an image processor 131.

The embodiment of FIG. 7 is generally the same as that of FIG. 6. However, the embodiment of FIG. 7 differs from that of FIG. 6 in that each of the lamps ($106_R$, $106_G$, $106_B$) is turned on at a time $T_{20}$ before a risetime (or a falltime) of the CCD control signal $P_D$ and turned off at at time $T_{30}$ after the next risetime (or the next falltime) of the same. In other words, by providing a cancelling time E before each integration time of the CCD line photosensor, the lamps $6_R$, $6_G$, $6_B$ are turned on and off in corresponding previous and subsequent intervals to prevent any interference with each other. Accordingly each color component data $D_E$ obtained in each interval comprising a mixture of two different color component data are not utilized.

The light quantity correction divider 12 of course takes the characteristic of the control photosensor 108 into account to achieve the correct white balance between the color component of R, G and B.

These two embodiments pertaining to the apparatus of FIG. 5 are also applicable to a method in which color component filters provided in front of a line photosensor are time-shared to filter the light emitted from a white lamp, as well as to a method in which three color component data are separately scanned and stored in memories.

As can be recognized from the above description of the four switching modes pertaining to the apparatus of FIGS. 1 and 5, the present invention is capable of obtaining a reproduction image of constant quality by regulating the light quantities emitted from lamps for the color components of R, G and B.

In this disclosure, there is shown and described only the preferred embodiments of the invention, but as aforementioned, it is to be understood that the invention is capable of use in various other combinations and environments; and is capable of changes or modifications within the scope of the inventive concept as expressed herein.

We claim:

1. In an apparatus using a CCD line photosensor for scanning an original image in a main scanning direction and a subscanning direction orthogonal to the main scanning direction, a method for correcting Red (R), Green (G) and Blue (B) color component data obtained by the CCD line photosensor from light emitted by R, G and B light source lamps and transmitted through or reflected at an original, comprising the steps of:
   (a) generating CCD line photosensor control pulses for enabling said line photosensor for integration periods;
   (b) turning on one of the three lamps at predetermined times after the occurrence of said control pulses;
   (c) detecting an effective light quantity emitted from the lamp selected in step (b);
   (d) turning off the lamp selected in step (b) when the effective light quantity emitted therefrom is at a setup quantity within a time period between the occurrences of two successive said control pulses;
   (e) repeating steps (b), (c) and (d) on the other two lamps and thereafter on each of the three lamps, and outputting each color component data obtained by the CCD line photosensor; and
   (f) repeating steps (a)-(e) for each scanning line in the subscanning direction of the original image.

2. In an apparatus using a CCD line photosensor for scanning an original image in a main scanning direction and a subscanning direction orthogonal to the main scanning direction, a method for correcting Red (R), Green (G) and Blue (B) color component data obtained by the CCD line photosensor from light emitted by R, G and B light source lamps and transmitted through or reflected at an original, comprising the steps of:
   (a) generating a periodic pulse signal having a period 2V, where V is an integration period of the line photosensor;
   (b) turning on one of the three lamps at a predetermined time before the occurrence of the periodic pulse signal;
   (c) detecting an effective light quantity emitted from the lamp selected in step (b);
   (d) generating a first pulse signal for controlling the CCD line photosensor approximately in the middle of the period of said periodic pulse signal when the effective light quantity emitted from the lamp selected in the step (b) reaches a setup quantity;
   (e) turning off the lamp selected in step (b) in the interval between the occurrence of the first pulse signal and the next occurrence of the periodic pulse signal;
   (f) repeating steps (b), (c) and (d) on the other two lamps and subsequently on each of the three lamps, and outputting each color component data obtained by the CCD line photosensor during each interval between the first pulse signal and the periodic pulse signal in the corresponding succeeding interval; and
   (g) repeating steps (a)-(f) for each scanning line in the subscanning direction of the original image.

3. In an apparatus using a CCD line photosensor for scanning an original image in a main scanning direction and a subscanning direction orthogonal to the main scanning direction, a method for correcting Red (R), Green (G) and Blue (B) color component data obtained by the CCD line photosensor from light emitted by R, G and B light source lamps and transmitted through or reflected at an original, comprising the steps of:
   (a) generating a periodic pulse signal for enabling the CCD line photosensor for a predetermined period;
   (b) turning on one of the three lamps a certain time after the occurrence of said periodic pulse signal;
   (c) detecting an effective light quantity emitted from the lamp selected in step (b);
   (d) turning off the lamp selected in step (b) at a time before the next occurrence of the pulse signal;
   (e) dividing a voltage corresponding to color component data obtained by the CCD line photosensor by a voltage corresponding to the effective light quantity emitted from the lamp during the next pulse signal period;
   (f) repeating steps (b), (c) and (d) on the other two lamps and subsequently on each of the three lamps; and
   (g) repeating steps (a)-(f) for each scanning line in the subscanning direction of the original image.

4. In an apparatus using a CCD line photosensor for scanning an original image in a main scanning direction and a subscanning direction orthogonal to the main scanning direction, a method for correcting Red (R), Green (G) and Blue (B) color component data obtained by the CCD line photosensor from light emitted by R, G and B light source lamps and transmitted through or reflected at an original, comprising the steps of:
   (a) generating a periodic pulse signal for enabling the CCD line photosensor for a predetermined period;
   (b) turning on one of the three lamps a certain time before the occurrence of the pulse signal;
   (c) sampling the effective light quantity emitted from the lamp selected in step (b) upon the occurrence of the pulse signal;
   (d) dividing a voltage corresponding to color component data obtained by the CCD line photosensor by a voltage corresponding to the effective light quantity sampled in step (c) to obtain corrected color component data;
   (e) turning off the lamp selected in step (b) a certain time after the next occurrence of the pulse signal;
   (f) repeating steps (b), (c), (d) and (e) on the other two lamps and subsequently on each of the three lamps, respectively, periodically every second period of the pulse signal; and
   (g) repeating steps (a)-(f) for each scanning line in the subscanning direction of the original image.

5. An apparatus for correcting R (Red), G (Green) and B (Blue) obtained by a CCD line photosensor from light emitted by R, G and B light source lamps and transmitted through or reflected at an original, comprising:

(a) a CCD controller for generating a pulse signal of a period V, where V is an integration time of the CCD line photosensor, for controlling said photosensor;

(b) a monitoring photosensor for converting the light quantity emitted from each of the R, G and B lamps into corresponding electric quantities;

(c) a first timing controller synchronized with the CCD control pulse signal for generating a reset signal;

(d) a second timing controller for generating a lamp turn on control signal at a certain time after the occurrence of the reset signal;

(e) a light quantity monitor for generating a light quantity detection pulse signal in response to a setup electric quantity received before the next occurrence of the CCD control pulse signal;

(f) a third timing controller for generating a lamp turn off control signal upon receiving the light quantity detection pulse;

(g) lamp controller responsive to the lamp turn on and lamp turn off control signals for turning on and off the lamps periodically and in order;

(h) means for scanning said original with said line photosensor along successive lines in a subscanning direction orthogonal to a main scanning direction; and (i) means for controlling an operation cycle of (a)–(g) once within each of said lines.

6. An apparatus for correcting R (Red), G (Green) and B (Blue) obtained by a CCD line photosensor from light emitted from R, G and B light source lamps transmitted through or reflected at an original, comprising:

(a) a CCD controller for generating a periodic CCD control pulse signal of a period 2V, where V is an integration time of the CCD line photosensor, and first CCD control pulse signals in the middle of the period of the periodic CCD control pulse signal;

(b) a monitoring photosensor for converting the light quantity emitted from each of the three R, G and B lamps into corresponding electric quantities;

(c) a first timing controller synchronized to the CCD control pulse signal for generating a reset signal;

(d) a second timing controller for generating a lamp turn on control signal to turn on one of the three lamps a certain time before the occurrence of the periodic CCD control pulse signal;

(e) a light quantity monitor synchronized to the reset signal for generating a light quantity detection pulse signal upon detecting that the electric quantity from the monitoring photosensor is at a setup electric quantity;

(f) a third timing controller responsive to the light quantity detection pulse for controlling the CCD controller to generate the first CCD control pulse signal;

(g) a fourth timing controller for generating a lamp turn off control signal a certain time after the occurrence of the first CCD control pulse signal;

(h) a lamp controller responsive to the turn on and turn off control signals for turning on and off the lamps periodically and in order;

(i) means for scanning said original with said line photosensor along successive lines in a subscanning direction orthogonal to a main scanning direction; and (j) means for controlling an operating cycle of (a)–(h) once within each of said lines.

7. An apparatus for correcting R (Red), G (Green) and B (Blue) obtained by a CCD line photosensor from light emitted from R, G and B light source lamps transmitted through or reflected at an original, comprising:

(a) a CCD controller for generating a pulse signal of a period V, where V is an integration time of the CCD line photosensor, for controlling said photosensor;

(b) a monitoring photosensor for converting the light quantity emitted from each of the R, G and B lamps into corresponding electric quantities;

(c) a first timing controller for generating a sampling pulse signal synchronized with the risetime of the CCD control pulse signal and a reset signal synchronized with the falltime of the CCD control pulse signal;

(d) a second timing controller for generating a lamp turn on signal a certain time after the occurrence of the CCD control pulse signal;

(e) a light quantity monitor responsive to the first timing controller for sampling the electric quantity output from the monitoring photosensor in synchronization with the sampling pulse and outputting the sampled data, the light quantity monitor being reset by the reset signal;

(f) a third timing controller for generating a lamp turn off signal at a time before the next occurrence of the CCD control pulse signal;

(g) a lamp controller responsive to the lamp turn on and lamp turn off signals;

(h) a light quantity correction divider responsive to the sampled data for dividing a voltage corresponding to color component data, obtained by the CCD line photosensor, by a voltage corresponding to the effective light quantity emitted from the lamp;

(i) means for scanning said original with said line photosensor along successive lines in a subscanning direction orthogonal to a main scanning direction; and (j) means for controlling an operating cycle of (a)–(h) once within each of said lines.

8. An apparatus for correcting R (Red), G (Green) and B (Blue) obtained by a CCD line photosensor from light emitted from R, G and B light source lamps transmitted through or reflected at an original, comprising:

(a) a CCD controller for outputting a pulse signal of a period V, where V is an integration time of the CCD line photosensor, for controlling said photosensor;

(b) a monitoring photosensor for converting the light quantities emitted from the R, G and B lamps into corresponding electric quantities;

(c) a first timing controller for generating a sampling pulse signal synchronized with the risetime of the CCD control pulse signal and a reset signal synchronized with the falltime of the CCD control pulse signal;

(d) a second timing controller for generating a lamp turn on signal a certain time after the occurrence of the CCD control pulse signal;

(e) a light quantity monitor responsive to the first timing controller for sampling the electric quantity output from the monitoring photosensor in synchronization with the sampling pulse and outputting the sampled data, the light quantity monitor being reset by the reset signal;

(f) a third timing controller for generating a lamp turn off signal in the interval of the next two occurrences of the CCD control pulse signal;

(g) a lamp controller responsive to the lamp turn on and lamp turn off signals for turning on and off the lamps periodically and in order, synchronized with every second pulse of the CCD control pulse signal;

(h) a light quantity correction divider responsive to the sampled data for dividing a voltage corresponding to color component data, obtained by the CCD line photosensor, by a voltage corresponding to the effective light quantity emitted from the lamp;

(i) means for scanning said original with said line photosensor along successive lines in a subscanning direction orthogonal to a main scanning direction; and (j) means for controlling an operating cycle of (a)–(h) once within each of said lines.

9. An apparatus as recited in claim 5 in which the light quantity monitor comprises:
   (a) a capacitor for charging electricity output from the monitoring photosensor;
   (b) a switch for short-circuiting the terminals of the capacitor synchronized with the occurrence of the reset signal; and
   (c) a level detector for outputting a detection signal to short circuit said switch when the voltage across the capacitor is at a setup level.

10. An apparatus as recited in claim 6 in which the light quantity monitor comprises:
    (a) a capacitor for charging electricity output from the monitoring photosensor;
    (b) a switch for short-circuiting the terminals of the capacitor synchronized with the occurrence of the reset signal; and
    (c) a level detector for outputting a detection signal to short circuit said switch when the voltage across the capacitor is at a setup level.

11. An apparatus as recited in claim 7 in which the light quantity monitor comprises:
    (a) a capacitor charged by voltage generated by the monitoring photosensor;
    (b) a switch for short-circuiting the terminals of the capacitor synchronized with the occurrence of the reset signal; and
    (c) a sample and hold circuit for holding the voltage stored in the capacitor and outputting said stored voltage to the light quantity correction divider.

12. An apparatus as recited in claim 8 in which the light quantity monitor comprises:
    (a) a capacitor charged by voltage generated by the monitoring photosensor;
    (b) a switch for short-circuiting the terminals of the capacitor synchronized with the occurrence of the reset signal; and
    (c) a sample and hold circuit for holding the voltage stored in the capacitor and outputting said stored voltage to the light quantity correction divider.

* * * * *